Patented June 17, 1924.

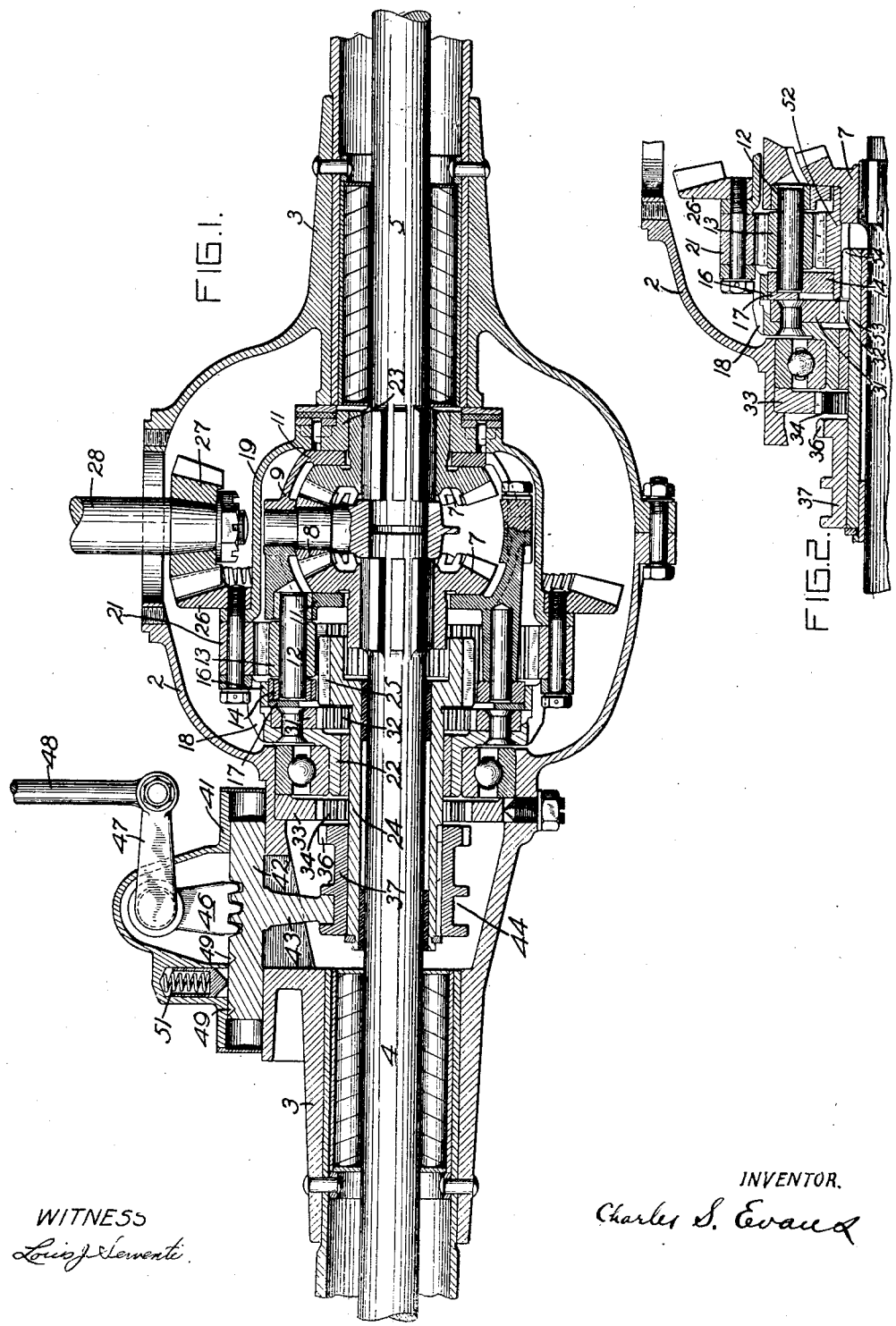

1,497,845

UNITED STATES PATENT OFFICE.

CHARLES S. EVANS, OF OAKLAND, CALIFORNIA.

TRANSMISSION MECHANISM.

Application filed October 13, 1923. Serial No. 668,311.

*To all whom it may concern:*

Be it known that I, CHARLES S. EVANS, a citizen of the United States, and a resident of Oakland, county of Alameda, State of California, have invented a new and useful Transmission Mechanism, of which the following is a specification.

My invention relates to transmission mechanisms for motor driven vehicles and particularly to such mechanisms in combination with a differential system, as is shown in the reissue patent to Starr, No. 15,424, dated July 25, 1922.

One of the objects of the invention is the provision, in a transmission mechanism of the character referred to, of improved means for connecting the parts together for rotation in the high speed combination. In prior mechanisms of this type, the ring gear mounting or rotor element has been locked for rotation with the differential casing, by engagement of the inner gear of the planetary system with the differential casing, thus preventing rotation of the intermediate gears of the planetary system on their journal axes. This arrangement places certain stresses upon the intermediate gears and their mountings which I desire to avoid. It is the purpose of my invention to provide means whereby the inner gear in the high speed combination is locked directly to the ring gear so that the driving stress is applied upon both sides of each intermediate gear, by the interlocked ring gear and inner gear, thus avoiding undesirable stresses which would be apt to cause failure of parts and noisy operation. Another object of the invention is the provision of a more efficient structure at a lower manufacturing cost.

My invention possesses other objects and features of advantage, some of which, with the foregoing, will be set forth in the following description of the preferred form of my invention which is illustrated in the drawing accompanying and forming part of the specification. It is to be understood that I do not limit myself to the showing made by the said drawing and description, as I may adopt variations of the preferred form within the scope of my invention as set forth in the claims.

In the drawings, Figure 1 is a horizontal sectional view of the transmission embodied in a rear axle housing, and Figure 2 is a similar view of a portion of a modified form of my invention.

My invention comprises a housing 2 provided with extensions 3 forming the housing for the rear or driving axles 4 and 5, which extend outwardly to the driving wheels of the vehicle in which my transmission mechanism is used. Mounted on the adjacent ends of the alined shafts 4 and 5, are differential gears 7, connected by differential pinions 8, mounted in the usual way in the differential casing 9. The differential casing is formed with flanges 11 bearing on the differential gears 7 as shown.

Extending laterally from the side of the differential casing are studs 12 preferably three in number, on each of which is journaled a pinion 13. These pinions constitute the intermediate gears of the planetary system. To provide an outer bearing for the studs 12 a ring 14 in which the outer ends of the studs are seated, is arranged within the wear rings 16 and 17, seated in the cup-shaped member 18, which forms part of the rotor. The rotor comprises the cup-shaped member 18 on one side and the cup-shaped member 19 on the other side, the ring gear 21 of the planetary system, which is in mesh with the intermediate gears 13, being rigidly mounted between the two members, the whole forming an enclosure for the planetary and differential systems.

The members 18 and 19 are provided with flanges 22 and 23, respectively, forming bearings on each side of the differential casing, the flange 22 bearing on the fixed housing 2, and the flange 23 on the hub of one of the differential gears 7. Having a bearing in the flange 22, is the sleeve 24 on the inner end of which is the gear 25, comprising the inner gear of the planetary system, which is in mesh with the intermediate gears 13. Fixed on the rotor is the bevel gear 26 in mesh with the driving pinion 27, which is fixed on the drive shaft 28. The rotor or ring gear mounting and the differential casing may be of the closed or cage type, but suitable apertures are provided in these casings for the free distribution of lubricant to the bearings.

Means are provided for locking the inner gear to the ring gear so that when the rotor is rotated the driving torque may be applied by the interlocked ring and inner gears, evenly on both sides of the intermediate gears, which are then inactive as gears, but serve to transmit a driving torque to the differential casing. Fixed on the inside of the rotor is a locking ring 31 having such character as to be adapted to mesh with the teeth of the inner gear when the inner gear is moved to the left of Figure 1. When such movement takes place and the teeth 32 are engaged, both rotor and inner gear are locked together, and since the teeth of the inner gear are not disengaged from the teeth of the intermediate gears, the intermediate gears are held rigidly between the inner and ring gears and function to transmit the driving stress to the differential casing, so that rotor, inner gear and differential casing are revolved as one unit. This combination gives the high speed of the transmission.

Means are also provided for locking the inner gear to the fixed housing 2 so as to effect the planetation of the intermediate gears and the driving of the differential casing in the low speed combination. Fixed in the housing 2 is the locking ring 33 formed with internally extending teeth 34 which are adapted to be engaged with the teeth 36 formed externally on the collar 37, which is splined on the outer end of the inner gear sleeve 24. As shown in Figure 1, the proportion and arrangement of the parts is such that both locking rings 31 and 33 may be left free of engagement with their respective complementary parts, in which case the transmission is in neutral position, or by movement of the sleeve 24 to the right, the fixed locking ring is engaged to hold the inner gear stationary, resulting in the low speed combination, or by moving the sleeve 24 to the left the locking ring 31 is engaged to effect the high speed combination. In all of these combinations it will be understood that the inner gear is in mesh with the intermediate gear, the teeth being wide enuf so that the shifting of the gear from side to side does not interrupt the engagement.

Means are provided for shifting the sleeve 24 to effect the various combinations described. Slidably mounted in the housing extension 41 is a rack bar 42, provided with an arm 43, engaging in the annular groove 44 formed in the collar 37. The bar 42 is moved by means of a toothed segment 46, provided with a lever arm 47 connected by a rod 48 to a suitable actuating lever adjacent the hand of the driver of the vehicle. The bar 42 is also formed with notches 49, so placed as to correspond with the low and high speed positions of the bar and adapted to be engaged by the spring truss pin 51, so that the bar is retained resiliently in the position to which it is shifted.

In Figure 2 I have shown a modified form of my invention in which the inner gear 52 and sleeve 53 are made in two pieces slidably splined together instead of in one piece as in Figure 1, so that the sleeve may be shifted axially to effect the speed combinations without axial movement of the inner gear. The splines 54 on the sleeve comprise the teeth, complementary to and adapted to engage the teeth 32 of the locking ring 31. In this case the inner gear may float within the intermediate gears, but preferably I provide bearing surfaces upon the hub of the adjacent differential gear 7 and within the support ring 14 as shown. Except for the fact that the sleeve only is shifted, the teeth 54, instead of the teeth of the inner gear, engaging the locking ring, the operation and results of the structure shown in Figure 2 are the same as those of the structure shown in Figure 1.

I claim:

1. The combination with a differential gear system of a planetary gear system including inner and ring gears and having its intermediate gears journaled on the differential casing, a fixed element, and means for optionally locking said inner gear to said fixed element or to said ring gear.

2. The combination with a differential gear system of a planetary gear system including inner and ring gears and having its intermediate gears journaled on the differential casing, a fixed element, a locking ring fixed for rotation with said ring gear, and means for optionally locking said inner gear to said fixed element or to said locking ring.

3. The combination with a differential gear system of a planetary gear system including inner and ring gears and having its intermediate gears journaled on the differential casing, a rotor on which said ring gear is mounted, a fixed element, and means for optionally locking said inner gear to said fixed element or to said rotor.

4. The combination with a differential gear system of a planetary gear system including inner and ring gears and having its intermediate gears journaled on the differential casing, a rotor on which said ring gear is mounted, a fixed element, a locking ring fixed on said rotor, and means for optionally locking said inner gear to said fixed element or to said locking ring.

5. The combination with a differential gear system of a planetary gear system including inner and ring gears and having its intermediate gears journaled on the differential casing, a rotor on which said ring gear is mounted, a fixed element, clutch members on said rotor and on said fixed element, complementary clutch members fixed for rotation with said inner gear, and means for optionally engaging said inner gear clutch members with either said rotor clutch members or said fixed element clutch members.

6. The combination with a differential gear system of a planetary gear system including inner and ring gears and having its intermediate gears journaled on the differential casing, a fixed element, a rotor enclosing the said gear systems and on which said ring gear is mounted, a toothed ring fixed on said rotor, a toothed ring fixed on said fixed element, complementary teeth on said inner gear, and means for optionally engaging either toothed ring with said complementary teeth.

In testimony whereof, I have hereunto set my hand.

CHARLES S. EVANS.